W. P. DEPPÉ.
HEATER FOR INTERNAL COMBUSTION ENGINES.
APPLICATION FILED APR. 16, 1914.
1,154,617.
Patented Sept. 28, 1915.
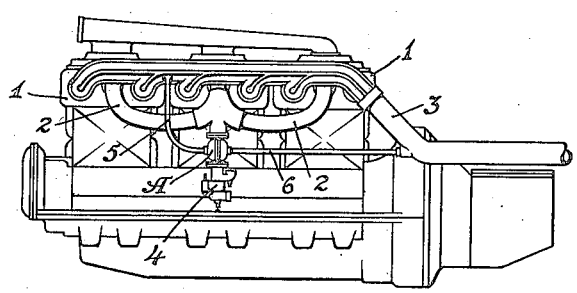
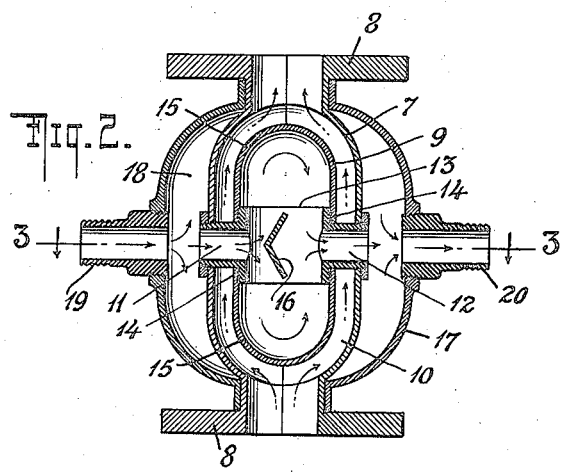
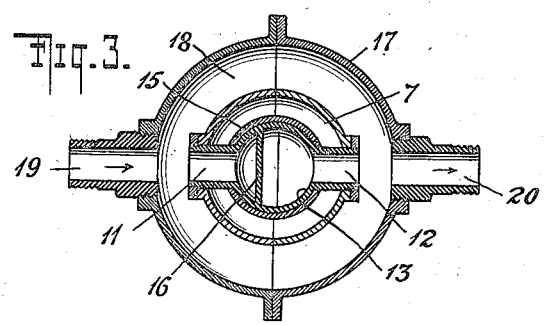
WITNESSES
INVENTOR
WILLIAM P. DEPPÉ
BY
ATTORNEYS

UNITED STATES PATENT OFFICE.

WILLIAM P. DEPPÉ, OF BAY SHORE, NEW YORK.

HEATER FOR INTERNAL-COMBUSTION ENGINES.

1,154,617.

Specification of Letters Patent. Patented Sept. 28, 1915.

Application filed April 16, 1914. Serial No. 832,209.

*To all whom it may concern:*

Be it known that I, WILLIAM P. DEPPÉ, a citizen of the United States, and resident of Bay Shore, county of Suffolk, State of New York, have invented a certain new and useful Improvement in Heaters for Internal-Combustion Engines, of which the following is a specification.

My invention relates to an improved vaporizer adapted for use in connection with all kinds of internal combustion engines for the purpose of heating the gas mixture before it enters the engine cylinders.

Numerous attempts have previously been made for heating the gas mixture in carbureters and manifolds, but so far as I am aware, such attempts have not resulted in accomplishing the purpose desired, for the reason that the heat was applied to the exterior of a solid stream of gas or gas mixture, thus heating only the shell or outer surface of the body of gases.

Various heating devices utilizing the heat of the exhaust pipe or the hot water from the cooling system, have been applied between the carbureter and the manifold inlet. But for the reasons stated, such heating appliances have not resulted in increased efficiency in proportion to the amount of available energy in the gas mixtures.

Heating devices in rather large tubes becoming a part of intake passages, utilizing the electrical energy in resistance coils, likewise do not produce desired results, because of the expansion losses in such devices more than offsetting the heating gains of the resistance coils possible in the tubes forming a part of the intake passage, and the further losses in engine efficiency, because of loss of volumetric efficiency, due to baffling the linear velocity of the mixture between carbureter and cylinders, in such devices.

Other devices have been applied which attempt to deliver the mixture in proper condition to cylinders, by preheating the air which passes through carbureters, to assist the vaporization of fuel oil, it being supposed that this would result in delivering the mixture to the cylinders at higher temperatures than usual. This process does result in slight increase in the temperature of mixture in the carbureter. But it is a well known fact that the action of vaporization is a cooling process of infinite rapidity, and even the preheated hot air passing into the carbureter inlets, will be very materially chilled by the time it passes into manifold inlets.

In testing out various heating appliances in connection with carbureters and intake passages of gas engines, I have found that practically all the previous devices give mixture temperatures in the passages so low that quantities of the supposed vaporized fuel are not vaporized at all, and even vaporized portions are condensed, and trickle back into the manifold, and carbureter, causing loading. Even in intake passages and valve chamber depressions, pools of the heavier portions of the oil fuel are formed. Thus, while the mixture, on leaving the carbureter throttle, may be rich in atomized hydrocarbons, it is materially reduced in possible flame propagation efficiency before it actually enters the cylinders. This is due largely to the cooling and partial condensation of the mixture in the manner described.

In some cases, I have found the temperature in the center of mixture fluid columns in large valve chambers as low as 10° F., during the operation of the engine, and the manifold partially frozen shut.

As a matter of fact, for the greatest efficiency in oil fuels, sustained power and work to be performed, considered per unit of fuel oil, the temperature of the mixture in the intake passages should be between 400 and 500° F.

The object of my improved vaporizer is to raise the temperature of the mixture after the loss of heat in the action within the carbureter, where the air is usually permitted ingress through so-called Venturi tubes or restricted passages, creating partial vacuum in carbureter, and causing sudden expansion and air shock, to partially evaporate and chiefly atomize the fuel oil, with resultant, instantaneous and great fall of temperature. Also to vaporize the finely atomized fuel oil after leaving the carbureter through the application of heat to the interior and exterior of the mixture column, to give temperature throughout the mass of the mixture considerably above the boiling points of the various weights of hydrocarbons existing in any fuel oils. Also to raise the temperature of the mixture after passing through carbureters sufficiently high above boiling points of the oils, to prevent the heat losses due to mixture travel, as described above, from chilling the mixture below the vaporization or boiling point of the various weights of hydrocarbons in oil fuels, before entering the cylinders for compression.

I accomplish the increase of heat in the mixture in the intake passages between carbureter and cylinders by spreading the mixture out into a very thin sheet as it were. Air or gas is not a good conductor of heat when in a thick stream as in a usual passage-way, therefore, I apply heat to both sides of the thin sheet of mixture, so that even though the mixture velocity is very high, it is quickly heated to a high temperature, vaporized and with heat sufficiently above the boiling point of the hydrocarbons to allow for the heat losses in mixture travel, above described.

To facilitate the spreading out of the gas mixture or forming the stream into a thin sheet, without allowing it to expand or baffle the linear velocity, I employ a bulbous tube forming part of the intake passage between carbureter and cylinders. Said tube being jacketed and provided with an interior, similarly shaped, bulbous body of such size, as to leave a narrow annular passage between the two members, through which the gas mixture is compelled to pass on its way to the cylinders. I connect this device preferably with the exhaust pipe of the engine so that the hot exhaust gases may circulate in the jacket about the bulbous tube and in the interior bulbous body and thus thoroughly and quickly heat the gas mixture both externally and internally of the annular stream as it passes through the intake passages. Also, this device gives increased efficiency when connected with water cooling systems of gas engines, or an electrical heater may be attached.

In carrying out my invention, I have embodied the same in a simple and compact form of the device as illustrated in the accompanying drawings, in which—

Figure 1 represents the device as connected in intake passages between one form of carbureter and the cylinders, of an internal combustion engine; Fig. 2 represents a longitudinal cross-section of the device and Fig. 3 a transverse cross-section thereof on the line 3—3 of Fig. 2.

Referring to the drawings, 1 represents an internal combustion engine of one of the present day types, provided with an exposed intake manifold 2 and an exhaust pipe 3 connected in the usual manner with the cylinders of this form of engine. The carbureter is represented at 4 and may be of any usual type which is adapted to evolve the gas mixture which is led through the intake passages to the engine cylinders. Preferably in this type of engine, as an example, I insert my device A between the manifold 2 and the carbureter 4 as illustrated in Fig. 1 of the drawings and connect it with the exhaust pipe of the engine in any suitable way such as by the pipes 5 and 6.

The preferred construction of my device is more fully shown in Figs. 2 and 3 of the drawings and comprises a bulbous tube 7 provided with flanges 8 at each end thereof, which flanges are adapted to receive bolts in the usual manner, whereby the device is secured in place between the carbureter pipe and the manifold. Preferably the bulbous tube is made of two sections, as illustrated, for greater convenience in assembling the same and particularly for inserting an interior bulbous body 9, which preferably is of substantially the same contour as the interior surface of the bulbous tube 7. The hollow bulbous body 9 is spaced away from the interior surface of the bulbous tube 7 so as to leave a passage 10 thereabout of substantial annular cross-section, which passage is adapted to spread out the gas mixture which is passing therethrough in the direction of the arrows in Fig. 2 of the drawings. The bulbous body 9 may be constructed in any suitable manner but is preferably hollow and provided with an inlet pipe at 11 and an outlet pipe at 12, which permit the circulation of heated exhaust gases in the interior of the hollow body 9 in the manner hereinafter described. In the present instance the tubes or pipes 11 and 12 are connected with an annular casting 13 which is provided with screw threads at 14, and each end thereof is closed by cup-shaped portions 15, which are screwed on to the ring 13 by the threads 14, thus forming the hollow bulbous body 9. In order to distribute the heated gases within the bulbous body 9 so as to thoroughly heat said body, a baffle plate 16 is preferably inserted at the mouth of the inlet tube 11 so as to deflect the gases toward the bulbous ends 15, thereby causing the gas to circulate within the body substantially as indicated by the arrows in Fig. 2.

The bulbous tube 7 is preferably surrounded by a two piece jacket 17 which is spaced therefrom so as to form a chamber 18 for receiving heated gases which circulate thereabout and heat the surface of the bulbous tube 7. An inlet pipe 19 and an outlet pipe 20 are connected to the jacket in any preferred manner, said pipes being also connected with the exhaust pipe of the engine by the pipes 5 and 6, substantially as illustrated, in Fig. 1 of the drawings. The heated exhaust gases will enter the inlet pipe 19 and circulate about the outer bulbous tube 7 and a portion of the heated gases will enter the pipe 11 and circulate in the interior of the bulbous body 9 and pass out through the tube 12 where, joining the gases in the jacket chamber they will pass out through the pipes 20 and 6 into the exhaust pipe 3. It will be understood that all of the joints and connected parts of the device are clamped together or united tightly so that there can be no leakage of the exhaust gases into the passage 10, designed for the gas mixture.

From the description thus far given of the apparatus it will be understood that the device is connected up so that the gas mixture will pass through the passage 10 and is spread out thereby into a thin annular stream which, by means of the heated bulbous body 9 and the jacket chamber 18 will be quickly and thoroughly heated both externally and internally to a very high temperature, depending entirely upon the temperature of the hot exhaust gases, which in some cases may be 1000 to 1500° F. in exhaust passage where tapped. By my device the temperature of the gas mixture will be proportionately high upon its delivery into the intake so that the loss of temperature in its passage to the cylinders will not be enough to reduce the temperature below an efficient working point.

I have found by actual experiments that when my device is used, particularly in connection with so-called gas mixtures of the heavier oils, the efficiency of the engine is increased from 25 to 50 per cent. over any methods now commercially exploited.

While I have shown and described the preferred form of my device, it will be understood that various modifications in the details of construction may be made without departing from the spirit and scope of the invention as defined in the claims.

I claim:

1. A heater for gaseous fuels comprising a tubular member, the ends of which are open and of like diameter, the intermediate portion between the ends being of larger diameter, a hollow cylindrical member within the intermediate portion of said tubular member and spaced therefrom to leave an annular channel for the passage of gaseous fuel, an outer jacket inclosing the intermediate portion of said tubular member and transversely extending pipes connecting the hollow cylindrical member and the jacket whereby heating fluid may be passed simultaneously through said jacket and said hollow cylindrical member for heating both the inside and outside surfaces of said annular passage.

2. A heater for gaseous fuels comprising a tubular member having an enlarged middle portion and two end portions, the end portions being substantially alike but of less diameter than the middle portion, a hollow cylindrical member located between the ends and within the enlarged portion of said tubular member and spaced therefrom to form an annular channel for the passage of gaseous fuel, an outer jacket member inclosing the enlarged middle portion of said tubular member and spaced therefrom to form a chamber, pipes passing transversely of said annular channel for holding said hollow member in place and to establish communication between the interior thereof and said jacket chamber and pipe nipples opening into said jacket chamber whereby heating fluid may be passed simultaneously through the latter and through said hollow cylindrical member for heating both sides of said annular channel.

3. A heater for gaseous fuels, adapted to be inserted between the carbureter and manifold of an internal combustion engine, comprising a member having flanged tubular ends for connecting the same to the carbureter and manifold respectively to form a continuous, approximately straight passage therebetween for the fuel gases, said tubular ends being integral with an intermediate cylindrical portion of larger diameter, a hollow cylindrical, closed ended bulbous member, within said intermediate portion of said member between the tubular ends, and spaced therefrom to leave an annular channel, the area of which is substantially equal to the area of said tubular ends, a jacket surrounding said intermediate portion of said member and pipes adapted for passing heating fluid simultaneously through said jacket and said inner bulbous member for heating and vaporizing the gaseous fuel passing through said channel.

4. A heater for gaseous fuels, adapted to be inserted between the carbureter and manifold of an internal combustion engine, comprising a tubular member of enlarged diameter at its middle portion, the ends being flanged and adapted to be connected to the carbureter and manifold respectively to form a continuous, approximately straight passage for the fuel gases, a hollow cylindrical bulbous member with convex ends, disposed within the enlarged middle portion of said tubular member and spaced therefrom to leave an annular channel, pipes extending across said annular channel adapted to support the bulbous member in position and communicating with the interior thereof, a jacket member surrounding the enlarged middle portion of said tubular member, said pipes, connected with the bulbous member, being adapted to communicate with the jacket cavity and nipples opening into said jacket, said pipes and nipples being adapted for the passage of heating fluid simultaneously through said jacket and the inner bulbous member whereby the sheet of gaseous fuel passing in said annular channel is heated inside and out.

5. A heater for gaseous fuels, adapted to be inserted between the carbureter and manifold of an internal combustion engine, comprising a cylindrical tubular member the ends of which are of reduced diameter and provided with means for securing the member to the carbureter and manifold respectively to form a continuous, approximately straight passage therebetween for the passage of the fuel gases, a hollow convex ended cylindrical member within said tubular member and spaced therefrom to form an annular channel the area of which is substantially the same as the area of the reduced ends of said tubular member, an inclosing jacket for said tubular member extending from the ends of reduced diameter and swelling out over the member and spaced therefrom to form a chamber therebetween and pipe connections between said chamber and the inner hollow cylindrical member whereby heating fluid, such as exhaust gases, may be simultaneously passed therethrough for heating and vaporizing the gaseous fuel.

In testimony whereof I have hereunto set my hand in the presence of two subscribing witnesses.

WILLIAM P. DEPPÉ.

Witnesses:
M. H. LOCKWOOD,
JOHN A. FERGUSON.